C. S. BROWN.
TRANSMISSION GEARING.
APPLICATION FILED MAY 18, 1914.

1,216,410.

Patented Feb. 20, 1917.
3 SHEETS—SHEET 1.

WITNESSES:

INVENTOR.
Charles S. Brown
BY
ATTORNEYS.

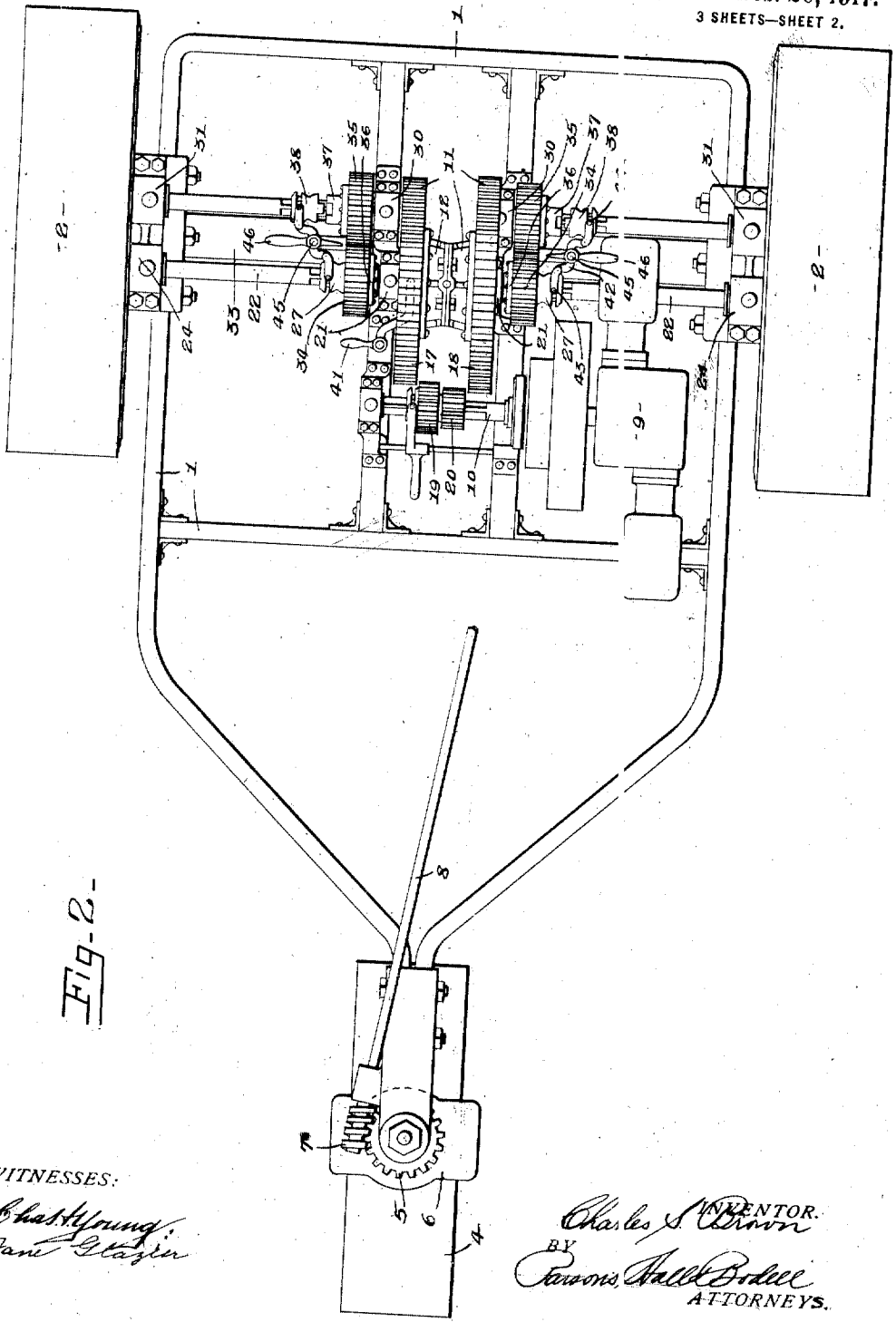

C. S. BROWN.
TRANSMISSION GEARING.
APPLICATION FILED MAY 11, 1914.
1,216,410.
Patented Feb. 20, 1917.
3 SHEETS—SHEET 3.
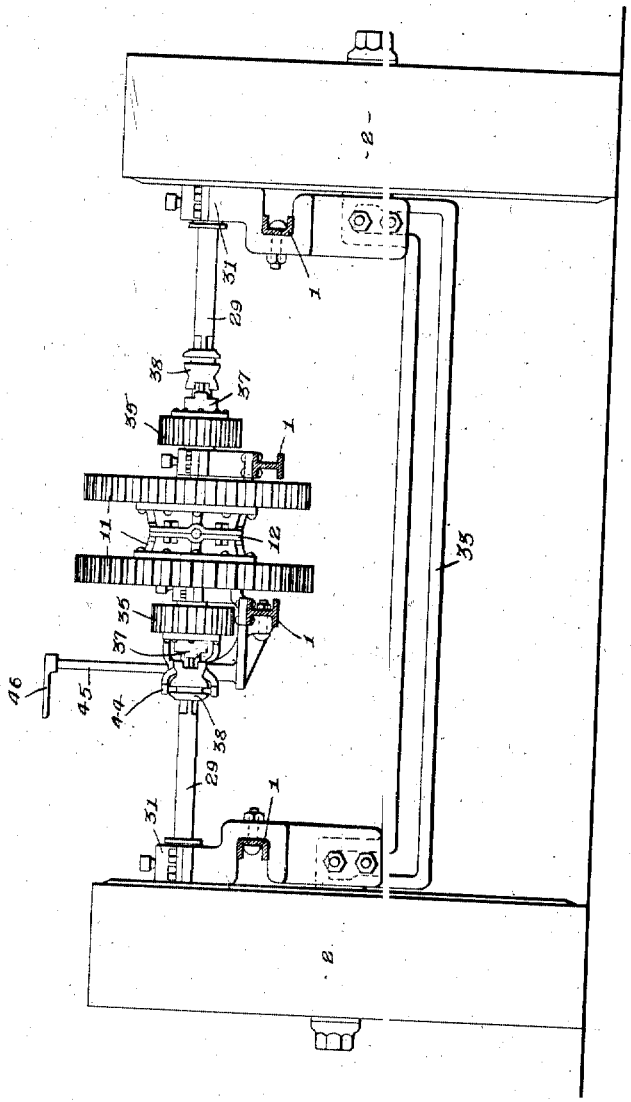

UNITED STATES PATENT OFFICE.

CHARLES S. BROWN, OF SYRACUSE, NEW YORK.

TRANSMISSION-GEARING.

1,216,410.

Specification of Letters Patent.

Patented Feb. 20, 1917.

Application filed May 18, 1914. Serial No. 839,348.

*To all whom it may concern:*

Be it known that I, CHARLES S. BROWN, a citizen of the United States, and a resident of Syracuse, in the county of Onondaga and State of New York, have invented a certain new and useful Transmission-Gearing, of which the following is a specification.

This invention relates to transmission gearing and has for its object a gearing particularly applicable for tractors and motor agricultural machines; and it consists in the combinations and constructions hereinafter set forth and claimed.

In describing this invention, reference is had to the accompanying drawings, in which like characters designate corresponding parts in all the views.

Fig. 2 is a plan view of a traction machine for which this gearing is adapted.

Fig. 3 is a rear elevation of the machine, parts being omitted.

Figure 1:
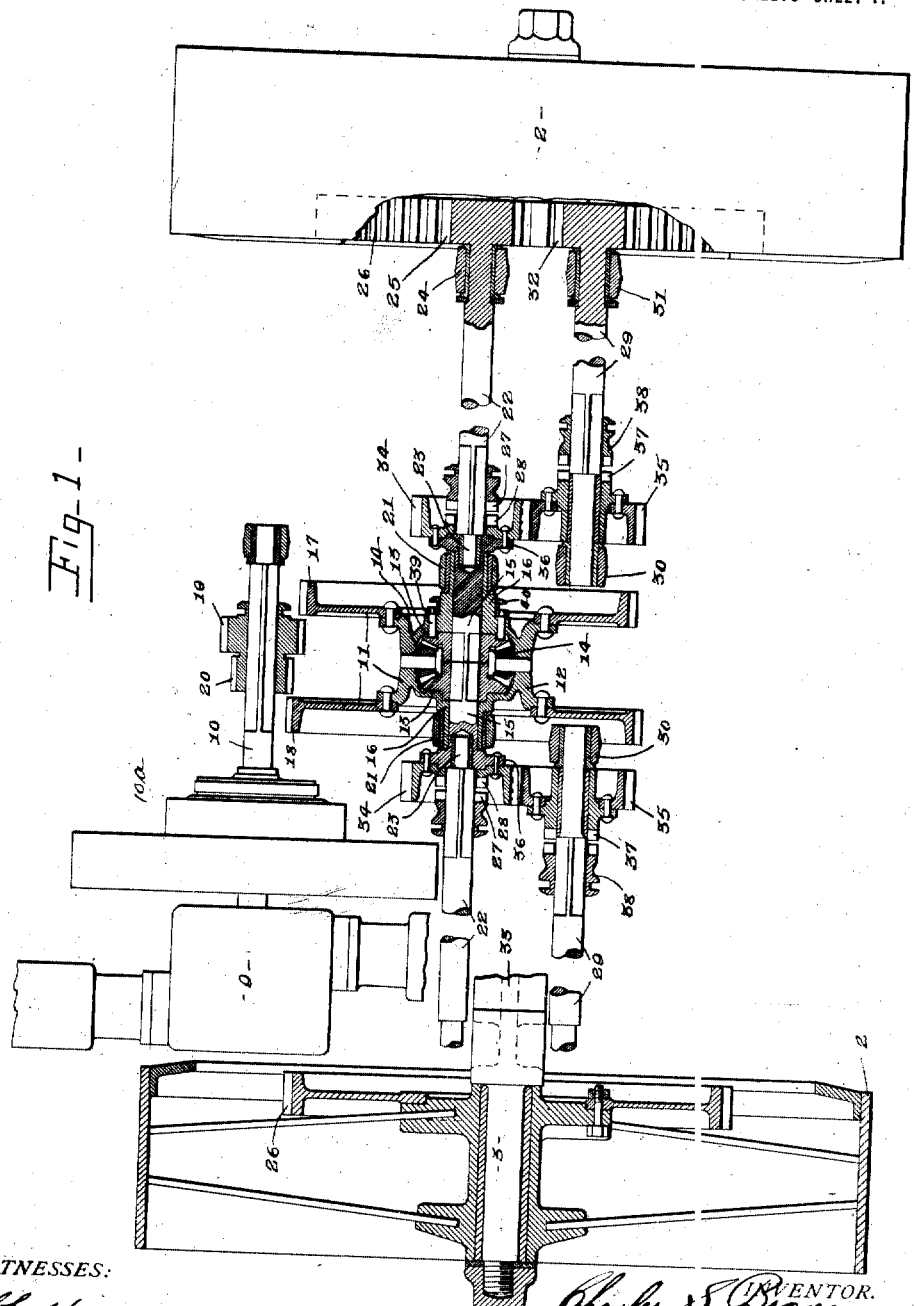
Figure 1 is a sectional view of my gearing, the contiguous parts of the tractor to which it is applied being also shown.

This transmission gearing includes, generally, a driving element, driven shafts connected to the traction wheels of the machine, and means for connecting and disconnecting the shafts and the driving element; and as here illustrated it includes also reversing shafts connected respectively to the traction wheels, and means for connecting and disconnecting the reversing shafts and the driving element, the connecting means being operable to connect any one of the driven and reversing shafts to the driving element, or for connecting to the driving element the driven shaft actuating one traction wheel of the machine and the reversing shaft actuating the other traction wheel.

More specifically, the transmission gearing includes a driving element including a differential gearing, driven shafts and means for connecting and disconnecting the driven shafts to opposite gears of the differential gearing and for making the differential gear ineffective whereby both driven shafts may be actuated forwardly or either one actuated forwardly independently of the other. The gearing also includes reversing shafts, power transmitting connections between the reversing shafts and opposite gears of the differential gearing, and means for operating the power transmitting connections to connect both reversing shafts to the differential gearing or to disconnect either one from and connect the other to, the differential gearing, or to connect one of the driven shafts to one gear of the differential gearing and one of the reversing shafts to the opposite gear of the differential gearing. Hence, a tractor or other machine provided with my gearing can be operated to drive both traction wheels forwardly in the ordinary manner or to drive either traction wheel forwardly while the other is standing still, thus turning the machine about a center located at the point the other traction wheel touches the ground, or the machine can be backed up in the ordinary manner, or one wheel of the tractor actuated in a reverse direction to turn the machine about a center located at the point the other traction wheel touches the ground, or one traction wheel can be driven in a forward direction while the other is driven in a rearward direction; thus moving the vehicle about a center located between the traction wheels, this center being determined by the position of the hand operated steering wheel.

1 designates the frame of a tractor or other machine equipped with my invention. 2 are the driving wheels loosely mounted on axles 3 supported by the frame 1. 4 designates the steering wheel located at the front end of the frame 1 and operated by suitable steering mechanism that is here shown as including a worm wheel 5 mounted on the spindle of the forks 6 supporting the front wheel 4, and a worm 7 meshing with the worm wheel and mounted on a staff 8 having a hand wheel located within reach of the seat of the machine.

9 designates the motor, and 10 a shaft driven by the motor, which shaft transmits the power of the motor to the gearing, a friction clutch 10ª being interposed between the motor shaft and the shaft 10. 11 designates the driving element as a whole, this driving element including a casing 12 supporting the differential gearing which is here shown as of the bevel gear type. The differential gearing includes opposite bevel gears 13 connected by equalizing pinions 14, the gears 13 being mounted upon shaft sections 15 located coaxially with the casing 12, and upon which are mounted the hubs 16 of the casing 12.

The driving element also includes a pair of gears 17 and 18 of different diameters, these gears being mounted on the casing 12 to rotate the same. The gears 17 and 18 receive power from the shaft 10 and are connected to the shaft 10 by means of pinions 19 and 20 here shown as slidable on the shaft 10 and normally occupying a neutral position and being shiftable as a unit in one direction from a neutral position to carry the pinion 19 in mesh with the gear 17, and in the opposite direction from neutral position to carry the pinion 20 into mesh with the gear 18.

The hubs 16 of the casing 12 are journaled in suitable bearings 21 supported by the frame 1 in any suitable manner.

22 are driven shafts connected to opposite gears 13 of the differential gearing, and being here shown as arranged end to end and coaxially with, the shaft sections 15 and having reduced ends 23 journaled in axial sockets formed in the outer ends of the shaft sections 15. The outer end portions of the shaft sections 22 are journaled in suitable bearings 24 supported in any suitable manner by the frame 1. Said shafts 22 carry gears 25 meshing with gears 26 carried by the tractor wheels 2.

The driven shafts 22 may be connected to, or disconnected from, the shaft sections 15 by means of shiftable clutch sections 27 movable axially on said shafts 22 into and out of engagement with clutch teeth 28 carried by the shaft sections 15.

29 are reversing shafts usually arranged in the rear of the shafts 22 and parallel therewith and journaled at their opposite ends in bearings 30 and 31 supported by the frame 1, the reversing shafts carrying gears 32 at their opposite ends which also mesh with the gears 26. The axle 33 which carries at its ends the spindles 3 has its intermediate part dropped in order to accommodate this transmission gearing.

The reversing shafts 29 are normally disconnected from the gears 13 respectively and are connected thereto by suitable power transmitting mechanism and means for connecting and disconnecting the mechanism and the reversing shafts. The power transmitting mechanism includes spur gears 34 and 35 carried respectively by the shaft sections 15 and the reversing shafts 29, the gears 34 being secured to annular flanges 36 at the outer ends of the shaft sections 15, and the gear 35 being carried by the clutch sections 37 mounted on the shafts 29. The clutch teeth 28, previously referred to, are here shown as formed integral with the gears 34.

38 are shiftable clutch sections slidable on the reversing shafts 29 respectively, and rotatable therewith and shiftable into and out of connection with the clutch sections 37. The gears 19 and 20 and the clutch sections 27 and 38 may be shifted in any suitable manner, and are here shown as provided with annular grooves which receive shifting forks, and any suitable shifting mechanisms may be provided therefor.

This transmission gearing is provided with means for locking the differential from movement comprising bolts 39 carried by a shiftable member or clutch 40, the bolts being movable through the case 12 into holes in one of the gears 13. The differential gear is locked from movement when either of the traction wheels is disconnected from the driving element and the machine is being turned either forwardly or rearwardly by the other traction wheel. The member 40 is operated by a shifting lever 41. The lock may be also thrown in effective position to prevent operation of the differential when driving straight, as when from the character of the ground one wheel might receive more driving movement than the other.

I have here shown one clutch section 27 and one clutch section 38 as coupled together by a lever 42 pivoted between its ends and operating forks 43, 44 at the opposite ends of the lever, the forks engaging the clutch sections 27 and 38. Movement of the lever 42 to carry the clutch section 27 into operative engagement with the clutch teeth 28 moves the clutch section 38 farther out of its neutral position; and movement of the lever 46 to carry the clutch section 38 into engagement with the clutch section 37 carries the clutch section 27 farther out of its neutral position. The levers are mounted on, or connected to, vertical rock shafts 45 having hand levers 46 at their upper ends.

This transmission gearing is particularly adapted to be used in tractors carrying agricultural implements, as for instance plows, and is particularly advantageous in that it can turn rearwardly or forwardly and can make short turns as the situation requires.

In operation, in going straight ahead, the double gear 19, 20 is shifted so that it is in mesh with either the gear 17 or 18, and both clutches 27 are shifted into engagement with the clutch teeth 28 and the machine is steered by means of the front wheel 4. When it is necessary to make a short turn in one direction or the other, as to the left to turn a corner or turn the machine around, the clutch section 27, associated with the left hand gear of the differential, can be shifted outwardly and the differential gearing locked by operating the clutch 40 so that the power is transmitted only to the right hand tractor 2. When it is desired to back up, both clutch sections 27 are shifted to neutral position and both clutch sections 38 shifted into engagement with the clutch teeth 37. If it is desired to back up and turn a sharper corner, one of the clutch sections 38 is shifted out of operative position, while the other clutch section 38 remains in operative position and the differential gear locked so that but one traction wheel 2 receives power in the reverse direction. When it is necessary to turn about a still sharper corner or to turn the machine in a small space, one of the clutches 27 is shifted into operative position while the other clutch 27 is shifted out of operative position, and the clutch 38 on the same side of the machine as the former clutch 27 is shifted out of operative position, while the other clutch 38 on the opposite side of the machine is shifted into operative position, so that one traction wheel drives forwardly and the other drives rearwardly. For instance, when the right hand clutch section 27 and the left hand clutch section 38 are shifted into operative position, and the left hand clutch section 27 and the right hand clutch section 38 are shifted out of operative position the right hand traction wheel will drive forwardly while the left hand traction wheel will drive rearwardly. Thus the machine will turn about centers located at the point either traction wheel engages the ground, or about center located between the traction wheels.

What I claim is:

1. The combination of a vehicle having a pair of traction wheels; of a transmission gearing comprising a driving element, a pair of shafts connected respectively to the traction wheels, a pair of reversing shafts connected respectively to the traction wheels, means for connecting and disconnecting any one of the shafts and the driving element and for connecting the driving shaft actuating one traction wheel, and the reversing shaft actuating the other traction wheel, substantially as and for the purpose specified.

2. A transmission gearing comprising a driving element including a differential gearing, driven shafts, means for connecting and disconnecting either driven shaft and opposite gears of the differential independently of the other driven shaft, and means for locking the differential, substantially as and for the purpose described.

3. A transmission gearing comprising a driving element including a differential gearing, driven shafts, means for connecting and disconnecting the driven shafts and opposite gears of the differential gearing, and means for locking the differential gearing, substantially as and for the purpose specified.

4. A transmission gearing comprising a driving element including a differential gearing and shaft sections actuated by the gearing, driven shafts, means for connecting and disconnecting the driven shafts and the shaft sections, and means for locking the differential gearing, substantially as and for the purpose set forth.

5. A transmission gearing comprising a driving element including a differential gearing, driven shafts, means for connecting and disconnecting the driven shafts and opposite gears of the differential gearing, reversing shafts, power transmitting connections between the opposite gears of the differential gearing and the reversing shafts, means for connecting and disconnecting the power transmitting connections and the reversing shafts, and means for locking the differential gearing, substantially as and for the purpose described.

6. A transmission gearing comprising a driving element including a differential gearing, driven shafts and reversing shafts, means for connecting and disconnecting each driven shaft and each reversing shaft to opposite gears of the differential gearing, and means for locking the differential gearing, substantially as and for the purpose specified.

7. In a transmission gearing, a driving element including a differential gearing, driven shafts, means for connecting and disconnecting either or both driven shafts to opposite gears respectively of the differential gearing whereby said driven shafts may be both driven forwardly or either forwardly while the other remains idle, and means for locking the differential gearing, substantially as and for the purpose set forth.

8. In a transmission gearing, a driving element including a differential gearing, driven shafts, reversing shafts, means for connecting either or both of the driven shafts to opposite gears of the differential gearing, means for locking the differential gearing, and means for connecting either or both of the reversing shafts to opposite gears of the differential gearing whereby the driven shafts may both be connected to rotate in a forward direction, or either shaft may be actuated in a forward direction while the other remains idle and whereby both reversing shafts may be connected to the driving element or either connected thereto while the other remains idle, and whereby either one of the driven shafts may be connected to rotate forwardly while the reverse shaft connected to the opposite gear of the differential gearing may be connected thereto, substantially as and for the purpose described.

9. In a gearing, a driving element including a differential gearing and shaft sections upon which opposite gears of the differential gearing are mounted, driven shafts arranged end to end with the shaft sections, respectively, means for connecting and disconnecting the driven shafts and the shaft sections, and means for locking the differential gearing from differential movement, substantially as and for the purpose set forth.

10. A transmission gearing comprising a driving element including a differential gearing having opposing gears, driven shafts arranged coaxially with the driving element, reversing shafts arranged substantially parallel to the driven shafts, and means for connecting and disconnecting the driven shafts to opposite gears of the differential gearing, and additional means for connecting and disconnecting the reversing shafts to opposite gears of the differential gearing, substantially as and for the purpose described.

11. A transmission gearing comprising a driving element including a differential gearing, and shaft sections actuated by the gearing, driven shafts arranged end to end with the shaft sections, reversing shafts arranged substantially parallel to the driven shafts, power transmitting connections between the shaft sections and the reversing shafts, means for connecting and disconnecting the driven shafts directly to said shaft sections, and means for connecting and disconnecting the power transmitting connections to the reversing shafts, substantially as and for the purpose specified.

12. The combination with a vehicle having a pair of traction wheels and a steering wheel; of a transmission gearing comprising a driving element including a differential gearing, driven shafts for actuating the traction wheels respectively, means for connecting and disconnecting the driven shafts and opposite gears of the differential gearing respectively, and means for locking the differential gearing, substantially as and for the purpose set forth.

13. The combination of a vehicle having a pair of traction wheels and a steering wheel; of a transmission gear including a differential gearing, driven shafts connected to the traction wheels respectively, reversing shafts connected to the traction wheels respectively, means for connecting and disconnecting the driven shafts and opposite gears of the differential gear, means for connecting the reversing shafts and opposite gears of the differential gearing, and means for locking the differential gearing, substantially as and for the purpose described.

In testimony whereof, I have hereunto signed my name in the presence of two attesting witnesses, at Syracuse, in the county of Onondaga, in the State of New York, this 27th day of April, 1914.

CHARLES S. BROWN.

Witnesses:
  CHAS. H. YOUNG,
  JANE H. GLAZIER.